Aug. 13, 1957  G. T. McCLURE  2,802,700
FLUID PRESSURE BRAKE APPARATUS
Filed Dec. 10, 1954
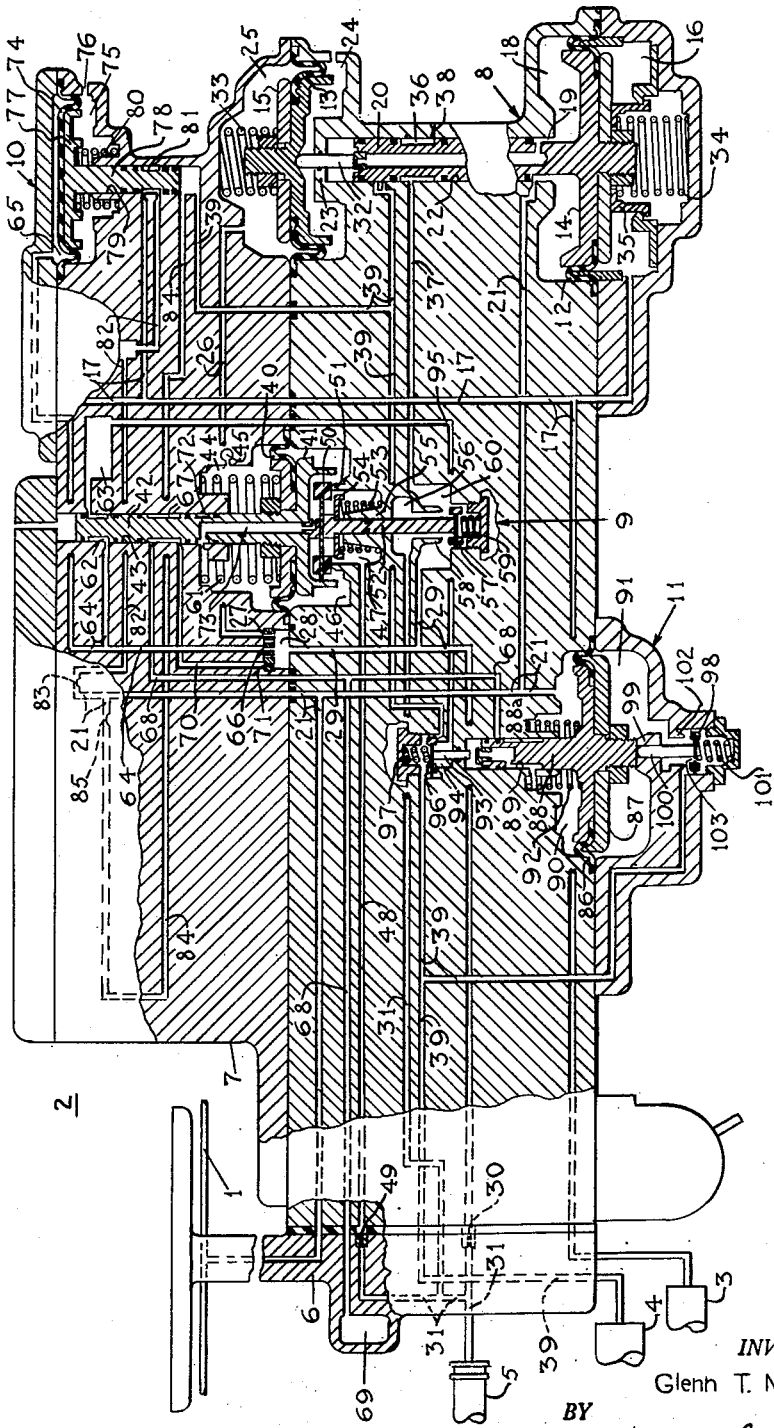
INVENTOR.
Glenn T. McClure
BY
Adelbert A. Steinmiller
ATTORNEY United States Patent Office 2,802,700
Patented Aug. 13, 1957

2,802,700

FLUID PRESSURE BRAKE APPARATUS

Glenn T. McClure, McKeesport, Pa., assignor to Westinghouse Air Brake Company, Wilmerding, Pa., a corporation of Pennsylvania Application December 10, 1954, Serial No. 474,355

6 Claims. (Cl. 303—38)

This invention relates to fluid pressure brake apparatus and more particularly to the type in which the degree of brake application and release is controlled according to the extent of reduction and restoration, respectively, in pressure of fluid in a brake pipe relative to a datum pressure in a control reservoir.

Where, as in Europe, it is customary to equip only a fraction of the cars of a train with brake apparatus of the above type and to control the brakes on the brake-equipped cars through operator-controlled variations, at the locomotive, in the pressure of fluid in a brake pipe that extends through all the cars of the train, it is desirable to provide on each such brake-equipped car a quick service valve device which is capable of responding to a slight (such as .7 p. s. i.) reduction in brake pipe pressure relative to pressure in an auxiliary reservoir by moving to a quick service position, in which the brake pipe is opened to a previously vented quick service volume that is then opened to a restricted quick service reduction communication. The purpose of this restricted communication is to assure that, irrespective of the number of cars without brake apparatus intervening between the particular brake-equipped car and the next rearward brake-equipped car in the train, and in which intervening cars the brake pipe pressure must also be reduced, a quick service reduction in brake pipe pressure will continue, after initial charging of the vented volume, until brake pipe pressure at the particular car has been reduced a selected degree (such as 4 p. s. i.), for thereby causing a corresponding service valve device on the particular car to respond to this selected degree of brake pipe pressure reduction by providing in a corresponding brake cylinder device fluid at a pressure (of say 10 p. s. i.) corresponding to that for a minimum brake application; said service valve device always being operative to provide a brake cylinder pressure which is proportionate to the extent of reduction in brake pipe pressure.

It will thus be apparent that if the rate at which brake pipe pressure is reduced during this so-called continued quick service activity is less than the rate at which auxiliary reservoir pressure is reduced by flow, for example, to the brake cylinder device, the quick service valve device may move from its quick service position toward or to a normal position and thus prematurely cut off this continued quick service activity by way of the restricted communication before brake pipe pressure has been reduced the aforementioned selected degree; and if this should occur, the service valve devices on the respective cars will limit the brake cylinder pressure accordingly, and the intended minimum brake application will not be realized, which is, of course, undesirable.

The principal object of this invention is therefore to provide an improved brake apparatus of the above type embodying novel means for insuring against premature cut-off of continued quick service activity.

Another object is to provide an improved railway car brake apparatus which operates to so control continued quick service activity as to produce a quick service reduction in brake pipe pressure of a selected degree at a given car irrespective of the brake pipe volume in the adjacent rearward cars not equipped with brake apparatus and which brake pipe volume varies according to the number of such adjacent non-equipped cars.

Another object is to provide an improved quick service valve device for use in brake apparatus of the above type.

According to the foregoing objects, an improved quick service valve device controls operation of novel means comprising a check valve that is interposed between an auxiliary reservoir passage and a volume which may be defined by an enlarged chamber at one side of the diaphragm of said valve device; said diaphragm being subject at its opposite side to brake pipe pressure in another chamber. The improved quick service valve device is adapted, when in a normal position, to hold the check valve unseated against opposition of a bias spring for thereby permitting equalization of fluid pressures in said auxiliary reservoir and volume; but when said valve device moves to a quick service position in response to a reduction in brake pipe pressure, said spring is adapted to seat the check valve for restricting the rate of back-flow of fluid under pressure from said volume into said auxiliary reservoir passage according to the selected flow capacity of a choke (which may be provided in said check valve) so that the quick service valve device will be maintained in quick service position until after continued quick service activity has been completed.

Other objects and advantages will become apparent from the following more detailed description of the invention and from the accompanying drawing, wherein the single figure is a diagrammatic view of a portion of a brake apparatus embodying the invention.

*Description*

Since many of the components of the improved brake apparatus may be generally similar in structure and in operation with the type shown and described in the copending application of Earle S. Cook, Serial No. 390,387, filed November 5, 1953, and assigned to the assignee of the present application, the disclosure in the accompanying drawing and in following description has been limited to those structural and operational characteristics which are deemed essential to a clear understanding of the invention and/or which differ from the precise structure shown in said copending application. In one or two instances, however, hereinafter to be noted, structure has been simplified where such simplification in no way affects the purpose or function of the present invention.

As shown in the drawing, the improved brake apparatus comprises the usual brake pipe 1, which is adapted to extend through the train and in which the pressure of fluid is adapted to be varied in the well-known manner by manual operation of the usual engineer's automatic brake valve device (not shown) provided on the locomotive.

A brake controlling valve device 2 is provided on each brake-equipped car of the train. Each such valve device 2 is adapted to respond to a chosen reduction in pressure in the brake pipe 1 relative to that in a control reservoir 3, for supplying fluid at a corresponding pressure from an auxiliary reservoir 4 to a brake cylinder device 5 for thereby effecting a corresponding degree of brake application on the particular car. Each valve device 2 is also adapted to respond to any degree of increase in pressure in the brake pipe 1 relative to that in the control reservoir 3 to release fluid under pressure to a proportionate degree from the brake cylinder device 5 and, at some time (not pertinent to the present invention) after said brake cylinder device is devoid of fluid under pressure, open the auxiliary reservoir 4 and control reservoir 3 to the brake pipe for permitting equalization of fluid pressures in said reservoirs with brake pipe pressure, in the usual manner.

The brake controlling valve device 2 comprises a pipe bracket 6, to which the brake pipe 1, control reservoir 3, auxiliary reservoir 4, and brake cylinder device 5 are adapted to be connected; and on one face of said bracket is mounted a sectionalized casing 7. Formed within, and in part defined by, the various sections of the casing 7 are a service valve device 8, an inshot valve device 9, a charging valve device 10, and a quick service valve device 11.

The service valve device 8 may, for sake of illustration, be of the type comprising, briefly, two coaxially arranged, spaced apart, annular, flexible diaphragms 12, 13 which are cooperably, though not positively, connected to each other so as to constitute a diaphragm stack, as will be understood from subsequent description. The diaphragms 12, 13 are suitably clamped adjacent their outer perpiheral edges between sections of the casing 7 and adjacent their inner peripheral edges between diaphragm follower assemblages 14, 15, respectively. The diaphragm 12 is subject at its under side, as viewed in the drawing, to pressure of fluid in a chamber 16, which is open by way of a passage 17 to the control reservoir 3; and said diaphragm is subject at the opposite side to pressure of fluid in a chamber 18 that is normally open, by way of a groove 19 in a cylindrical slide valve 20, to a passage 21 that leads to the brake pipe 1.

The slide valve 20, which is arranged coaxially with the follower assemblage 14 and preferably formed integrally therewith, has sealing, slidably guided engagement with the wall of an aligned bore 22 that is open at one end to the chamber 18 and at the opposite end terminates at a casing partition 23 which separates the bore 22 from an atmospheric chamber 24 at the adjacent side of the diaphragm 13. The diaphragm 13 is subject at the side opposite the chamber 24 to pressure of fluid in a chamber 25 that is constantly open to the brake cylinder device 5 by way of a pasage 26, the usual baffle choke 27, a chamber 28, a passage 29, a brake cylinder application choke 30 and a passage 31. A pusher stem 32, coaxially arranged with the slide valve 20, is adapted at one end to abuttingly engage the projecting end of said slide valve and at the opposite end to engage the adjacent side of the follower assemblage 15; said pusher stem intermediate its ends having sealing, slidably guided engagement with the wall of an aligned bore through the casing partition 23.

When brake pipe pressure, as noted in chamber 18, is substantially equal to the control reservoir pressure in chamber 16, the slide valve 20 is adapted to assume a normal or brake release position, in which it is shown in the drawing, due to the action on the diaphragm stack of a helical spring 33 in the chamber 25, which spring acts through the follower assemblage 15, pusher stem 32, and slide valve 20, to cause the follower assemblage 14 to operatively engage, but not compress, a helical spring 34 that is retained within a yieldable spring support 55 in the chamber 16. With the slide valve 20 in brake release position, an elongated annular cavity 36 formed in said slide valve connects a passage 37 to the usual brake cylinder release choke 38; said passage 37 being constantly open to the brake cylinder device 5 by way of communication hereinafter to be described.

Upon a reduction in brake pipe pressure in passage 21 and hence in chamber 18, the diaphragm stack will move in the direction of chamber 25 for shifting the slide valve 20 to a brake application position, in which the cavity 36 is so disposed as to disconnect the brake cylinder passage 37 from the brake cylinder release choke 38 and to connect said passage 37 to a passage 39 that is constantly open to the auxiliary reservoir 4, so that fluid under pressure from said auxiliary reservoir may flow to the brake cylinder device 5 via passages 39 and 37, and thence via alternative communications controlled by the inshot valve device 9 and hereinafter to be described, for applying brakes to a degree corresponding to the chosen reduction in brake pipe pressure.

The inshot valve device 9 may comprise a flexible diaphragm 40 that is suitably clamped adjacent its outer periphery between sections of the casing 7 and is operatively connected through the medium of a diaphragm follower assemblage 41 to a cylindrical slide valve 42 having sealing, slidably guided engagement with the wall of an aligned bore 43 in said casing. At the side of the diaphragm 40 adjacent the slide valve 42 is a chamber 44 that is open to atmosphere by way of a vent port 45; and at the opposite side of said diaphragm is a chamber 46 which, under a condition hereinafter to be described, is adapted to be connected to a chamber 47 that, in turn, is open to the brake cylinder device 5 by way of a passage 48, the usual inshot baffle choke 49, and a branch of the passage 31.

For controlling fluid pressure communication between the chambers 46 and 47, there is provided a preferably disc-shaped valve 50 that is adapted to seat against an annular valve seat rib 51 formed by a projecting part of the casing encircling the chamber 47. An actuating stem 52 is held in abutting engagement with the lower face of the valve 50, as viewed in the drawing, through the medium of a helical spring 53, which is disposed in the chamber 47 and acts on an annular spring seat 54 carried by said stem. Intermediate its ends the stem 52 has sealing, slidably guided engagement with the wall of a bore through a casing partition 55 separating the chamber 47 from a chamber 56 that is constantly open to the brake cylinder device 5 by way of a branch of the passage 31. The stem 52 projects into the chamber 56 and at its lower end is adapted to engage and unseat a preferably disc-shaped inshot valve 57 from an annular valve seat rib 58 against resistance of a helical bias spring 59 in a chamber 60 that connects the passage 37 with a branch of the passage 29; said inshot valve being provided for controlling fluid pressure communication between the chambers 60 and 56.

A helical regulating spring 61 in the atmospheric chamber 44 acts on the follower assemblage 41 for causing the latter to engage the upper side, as viewed in the drawing, of the valve 50 for normally holding said valve seated and, through the medium of said valve and the stem 52, holding the inshot valve 57 unseated against the resistance of bias spring 59, as shown in the drawing. And also, by virtue of this action of spring 61 on the follower assemblage 41, the slide valve 42, which is carried by said follower assemblage, will be disposed in a normal position, in which it is shown in the drawing. With the slide valve 42 in normal position, an annular cavity 62 formed in said slide valve connects a timing volume 63 to a passage 64, one branch of which passage 64 leads to a pressure chamber 65 of the charging valve device 10 and another branch of which is open through a charging valve delay choke 66 to the chamber 28; also, an annular cavity 67 in said slide valve connects a passage 68, leading to a quick service volume 69, with a passage 70 that is open to the chamber 28 via the usual continued quick service reduction choke 71; and an annular cavity 72 in said slide valve connects the atmospheric chamber 44 with an internal restricted passageway 73 that leads through the slide valve 42 and follower assemblage 41 to the chamber 46, for thereby opening the chamber 46 to atmosphere by way of the atmospheric chamber 44.

Thus, the inshot valve 57 will be unseated and the slide valve 42 will be in its normal position for establishing the connections just described, whenever the snap-acting valve 50 is seated, as will occur when brake cylinder pressure in chamber 47 is less than a chosen value, such as 10 p. s. i., as determined substantially by the selected value of the regulating spring 61.

The charging valve device 10 may comprise, briefly, a flexible diaphragm 74 which is suitably clamped about its outer peripheral edge between sections of the casing 7 and separates the pressure chamber 65 from a chamber 75 which is open to atmosphere by way of a vent port 76. The diaphragm 74 is operatively connected through the medium of a diaphragm follower 77 to a cylindrical slide valve 78 that is preferably formed integrally with said follower and has sealing, slidably guided engagement with the wall of a bore 79 that is open at one end to the chamber 75. A helical bias spring 80 in the chamber 75 urges the slide valve 78 to a charging position, in which it is shown in the drawing, and which position will be assumed when the pressure chamber 65 is substantially devoid of fluid under pressure.

With the slide valve 78 in charging position, an annular cavity 81 in said slide valve will connect a branch of the control reservoir passage 17 to a control reservoir charging communication which may, for sake of illustration and simplified description, comprise a passage 82 that is open by way of a choke 83 to a branch of the brake pipe passage 21, for permitting equalization of the pressure in the control reservoir 3 with that in the brake pipe 1 at the rate controlled by said choke. And also, with the slide valve 78 in its charging position, the free end of said slide valve uncovers a branch of the auxiliary reservoir passage 39 to an auxiliary reservoir charging communication, which may, for sake of illustration and simplified description, comprise a passage 84 that is open by way of a choke 85 to another branch of the brake pipe passage 21, for enabling the auxiliary reservoir 4 to be charged with fluid under pressure from the brake pipe 1 at the rate controlled by said choke.

Upon supply of fluid under pressure to the chamber 65 of the charging valve device 10, the diaphragm 74 is adapted to deflect against resistance of the spring 80 for shifting the slide valve 78 to a cut-off position, in which it is so disposed as to disconnect the passages 17, 39 from the passages 82, 84, respectively, for preventing backflow of fluid under pressure from the reservoirs 3, 6 into the brake pipe 1.

The improved quick service valve device 11 preferably comprises an annular, flexible diaphragm 86 that is suitably clamped adjacent its outer peripheral edge between sections of the casing 7 and adjacent its inner edge between portions of a follower assemblage 87 that carries a cylindrical slide valve 88 which has sealing, slidably guided engagement with the wall of an aligned bore 89 in the casing. The diaphragm 86 is subject, at the side adjacent the slide valve 88, to pressure of fluid in a chamber 90 which is constantly open to the brake pipe 1 by way of a branch of the brake pipe passage 21; and said diaphragm is subject at the opposite side to pressure of fluid in a chamber 91, that is normally open to the auxiliary reservoir 4 by way of a communication hereinafter to be described.

A helical bias spring 92 in the chamber 90 acts on the follower assemblage 87 for urging the slide valve 88 to a normal position, in which it is shown in the drawing, and which position will be assumed when pressure in chamber 90 is substantially equal to the opposing pressure in chamber 91. With the slide valve 88 in normal position, an annular cavity 88a therein, which is constantly open to the chamber 90, is out of registry with a branch of the passage 68; and the projecting end of said slide valve is out of engagement with a pusher stem 93 which intermediate its ends has sealing, slidably guided engagement with the wall of a bore through a casing partition that separates the inner end of bore 89 from a chamber 94 which is constantly open by way of a passage 95 to the timing volume 63. The pusher stem 93, at its end which projects into the chamber 94, is abuttingly connected to a coaxially arranged, preferably disc-shaped check valve 96 that is provided for controlling fluid pressure communication between a branch of the auxiliary reservoir passage 39 and the chamber 94. A spring 97 urges the check valve 96 into seating engagement with an annular valve seat rib formed by a projecting part of the casing encircling the chamber 94, for preventing communication between the passage 39 and chamber 94 when the slide valve 88 is in its normal position.

Upon a reduction in excess of a chosen slight degree, such as .7 p. s. i., in pressure of fluid in chamber 90 below the opposing pressure in chamber 91, the diaphragm 86 is adapted to deflect against resistance of the spring 92 for thereby shifting the slide valve 88 to a quick service position, in which the chamber 90 is opened by way of the cavity 88a to the pressure 68 and the check valve 96 is unseated through the medium of said slide valve and the pusher stem 93, for reasons to be explained subsequently.

With the apparatus as thus far described, assume that the brake pipe 1 is charged to normal operating value. In consequence thereof, brake pipe pressure in chamber 18 and the spring 33 in chamber 25, acting on the diaphragm stack of the service valve device 8 in opposition to control reservoir pressure in chamber 16, will cause the slide valve 20 to be maintained in its previously defined brake release position, in which the brake cylinder device 5 is opened to atmosphere. With the brake cylinder device 4 devoid of fluid under pressure, the inshot valve 57 will be unseated and the inshot slide valve 42 will be in its previously defined normal position, in which the timing volume 63 and quick service volume 69 are opened to the vented brake cylinder device 5 by way of slide valve cavities 62, 67 and chokes 66, 71, respectively. With the brake cylinder device 5 and timing volume 63 thus vented, the chamber 65 of the charging valve device 10 will also be vented by way of the choke 66, in consequence of which the slide valve 78 will be in its previously defined charging position, in which the control reservoir 3 and auxiliary reservoir 4 are open to the brake pipe 1 by way of previously described communications so that pressure of fluid in said reservoirs will equalize with that in the brake pipe. The slide valve 88 of the quick service valve device 11 will be in its previously defined normal position because the combined effect of brake pipe pressure in chamber 90 and action of the bias spring 92 will overcome the opposing effect on the diaphragm 86 of pressure in the chamber 91; and, with said slide valve 88 in normal position, the brake pipe 1 will be closed to the quick service volume 69.

Assume now that, by operation of the aforementioned engineer's automatic brake valve device on the locomotive, the pressure of fluid in the brake pipe 1 on a particular brake-equipped car, and hence in the passage 21 and chamber 90 of the quick service valve device 11 on said car, is reduced a slight degree, such as the illustratively assumed .7 p. s. i., relative to the opposing pressure in chamber 91. In consequence of this reduction in brake pipe pressure, quick service valve diaphragm 86 will deflect against resistance of the bias spring 92 and shift the slide valve 88 to its quick service position for causing fluid under pressure to be locally released from the brake pipe into the vented quick service volume 69 and, then after said volume has been charged, permitting this quick service reduction in brake pipe pressure to continue by flow of such fluid into the brake cylinder device 5 by way of the passage 68, cavity 67 of the inshot slide valve 42, passage 70, the quick service reduction choke 71, and passage 29, at the rate controlled by said choke. And also, with the quick service slide valve 88 in its quick service position, said slide valve, acting through the pusher stem 93, will unseat the valve 96 against resistance of auxiliary reservoir pressure and action of the bias spring 97 for supplying fluid under pressure via the auxiliary reservoir passage 39 and passage 95 to the timing volume 63, whence it will flow via the inshot slide valve cavity 62 and passage 64 to the pressure chamber 65 of the charging valve device 10 for shifting the charging slide valve 78 to its previously defined cut-off position, in which the reservoirs 3, 4 are cut off from the brake pipe 1 for preventing pressure of fluid in said reservoirs from equalizing with reduced brake pipe pressure.

The diaphragm stack of service valve device 8 will respond to this reduction in the brake pipe pressure, as noted in the chamber 18, by moving the slide valve 20 from brake release position to its previously defined brake application position for disconnecting the brake cylinder device 5 from atmosphere by way of the release choke 38 and connecting the auxiliary reservoir passage 39 by way of the service slide valve cavity 36 to the passage 37. Under this condition, fluid under pressure will flow from the auxiliary reservoir 4 via the passage 37, chamber 60, and thence past the unseated inshot valve 57 into the chamber 56, whence it will flow at an unrestricted rate via the passage 31 to the brake cylinder device 5 for rapidly taking up slack in the brake rigging. When brake cylinder pressure, as noted by way of the baffle choke 49 and the passage 48 in the chamber 47 of the inshot valve device 9, exceeds the aforementioned chosen value, the valve 50 will snap open and cause the diaphragm 40 to deflect upwardly and thus shift the inshot slide valve 42 from its normal position to an upper position and, by thus relieving the downward thrust previously exerted by pusher stem 52 on the inshot valve 57, permit the spring 59 to seat said inshot valve. Under this condition, fluid under pressure thenceforth supplied to the brake cylinder device 5 will flow via passage 37, chamber 60, passage 29 and the brake cylinder application choke 30 to the passage 31 at the restricted rate controlled by said choke. With the slide valve 42 in its upper position, the timing volume 63 which is charged with air from the auxiliary reservoir 4 will be disconnected from the passage 64 and the pressure chamber 65 of the charging valve device 10 and will be maintained so disconnected until the inshot slide valve 42 returns to its normal position responsively to a reduction in brake cylinder pressure in chambers 47, 46 to below a certain value, such as about 5 p. s. i.; whereupon air theretofore trapped in the timing volume 63 will be released via the valve cavity 62 of the inshot slide valve 42 in normal position into the chamber 65 for delaying return of charging valve 78 to charging position for a period determined in part by the selected size of delay choke 66, for reasons not pertinent to the present invention but fully explained in the copending application of John W. Rush, Serial No. 391,503, filed November 12, 1953, and assigned to the assignee of the present invention. Also with inshot slide valve 42 in its upper position, the quick service passage 68 and quick service volume 69 will be disconnected from the quick service reduction choke 71 for thereby terminating continued quick service activity; and the inshot slide valve cavity 72 will be so disposed as to disconnect the atmospheric chamber 44 from the chamber 46.

Meanwhile, brake cylinder pressure as noted by way of the baffle choke 27 and passage 26 in the chamber 25 of the service valve device 8 will increase substantially with brake cylinder pressure, such that when the brake cylinder pressure has attained a value corresponding to the selected degree of reduction in brake pipe pressure as noted in the chamber 18, the service valve diaphragm stack will shift downward, as viewed in the drawing, to a lap position in which the slide valve cavity 36 is so disposed as to disconnect the passage 37 from both the auxiliary reservoir passage 39 and the brake cylinder release choke 38, for thereby bottling up fluid in the brake cylinder device 5 at the desired pressure and causing a corresponding degree of brake application.

It will now be noted that if, as heretofore proposed, the chamber 91 of the quick service valve device is constantly open to the auxiliary reservoir 4, there is a possibility that the pressure of fluid in chamber 91 may, after the quick service slide valve 88 has moved to quick service position, reduce at a faster rate than brake pipe pressure in chamber 90 and thus cause the diaphragm 86 to deflect in the direction of chamber 91 and shift the slide valve 88 prematurely and undesirably back toward or to its normal position.

This condition is most likely to occur when, by operation of the engineer's brake valve device on the locomotive, a slight reduction, such as the illustratively assumed .7 p. s. i., in brake pipe pressure is effected at the brake-equipped car nearest the locomotive and the operator relies upon continued quick service activity (i. e., continued blow down of brake pipe pressure through the quick service reduction choke 71 after initial charging of the quick service volume 69) to assure a local reduction in brake pipe pressure on such car of a selected degree, heretofore assumed as 4 p. s. i., for providing a brake cylinder pressure of, say, 10 p. s. i. corresponding to a minimum brake application, as well as initiating serial operation of the quick service valve devices on the brake-equipped cars toward the rear of the train, such that each such valve device will move to its respective quick service position and then effect a quick service reduction in brake pipe pressure of said selected degree for effecting the minimum brake application on the corresponding car. It will thus be realized that if the slide valve 88 of a particular quick service valve device 11 should move back toward or to normal position, in the manner just described, and thus prematurely cut off continued quick service activity before the aforementioned selected degree of brake pipe reduction has been effected, brake pipe pressure, as noted in chamber 18 of the service valve device 8, will then not be reduced sufficiently by way of the quick service reduction choke 71 to cause realization of the desired brake cylinder pressure, for it will be recalled that the service valve device operates to provide a brake cylinder pressure proportionate to the extent of brake pipe reduction. This premature cut-off of continued quick service activity may occur, for example, as a result of one or more of the following: reduction in auxiliary reservoir pressure by flow by way of the service slide valve 20 to the brake cylinder device 5; depletion of auxiliary reservoir pressure by flow to the timing volume 63 and pressure chamber 65 of the charging valve device 10 by way of the unseated valve 96, operation of which is controlled by the quick service slide valve 88; or a retarded rate of quick service reduction, such as will occur when the quick service valve device 11 on a particular car is required to reduce the pressure in the "dead" brake pipe volume on a large number of cars not equipped with brake apparatus and intervening between said particular car and the next rearward brake-equipped car in the train.

It is therefore desirable that an improved brake apparatus be provided which embodies means for insuring against premature cut-off of continued quick service activity, for thereby positively insuring that the aforementioned selected degree of quick service reduction in the brake pipe will be effected when the operator initiates a slight reduction in pressure in the brake pipe at the locomotive.

To this end and according to the invention, the improved quick service valve device 11 has a chamber 91 which is preferably of substantially greater volume than heretofore used; and a check valve 98 is interposed between the chamber 91 and a branch of the auxiliary reservoir passage 39. The normal position of the slide valve 88 of the improved quick service valve device 11 is defined by abutting engagement of the follower assemblage 87 with a stop surface preferably formed on a part 99 of the casing 7 that projects laterally into the chamber 91 but does not partition said chamber. A pusher stem 100, which is coaxially aligned with the follower assemblage 87 and the check valve 98, is slidably guided in a bore through the part 99 of the casing.

With the quick service slide valve 88 in normal position, the follower assemblage 87 not only engages the aforementioned stop surface on part 99 but also abuttingly engages the pusher stem 100 for acting through the medium of said pusher stem to operatively unseat the check valve 98 against resistance of a helical spring 101 and thus permit unrestricted fluid pressure communication between the auxiliary reservoir passage 39 and the chamber 91 so that pressure in chamber 91 will be equal to auxiliary reservoir pressure which, in turn, may be equal to brake pipe pressure if, under previously described conditions, the brake pipe 1 is open to the auxiliary reservoir 4 by way of the slide valve 78 of the charging valve device 10; and with pressure in chamber 91 thus substantially equal to brake pipe pressure in chamber 90, a slight reduction in brake pipe pressure of the illustratively assumed .7 p. s. i. will develop a sufficient fluid pressure differential across the diaphragm 86 to cause the slide valve 88 to be shifted to quick service position.

With the slide valve 88 of the improved quick service valve device 11 in its quick service position, the brake pipe passage 21 will be opened to the passage 68 via the slide valve cavity 88a, and the check valve 96 will be unseated through the medium of the slide valve and pusher stem 93; and, in addition, the diaphragm 86 and hence the follower assemblage 87 will be so disposed that the latter will no longer exert a downward thrust force on the pusher stem 100, and hence the spring 101 will be permitted to seat the check valve 98 against an annular valve seat rib 102 that encircles, with substantial radial clearance, a portion of said pusher stem. With the check valve 98 seated, free flow of fluid under pressure between the chamber 91 and auxiliary reservoir passage 39 will be prevented.

It is to be noted that the pusher stem 100 is of such length as to maintain the check valve 98 unseated until the slide valve 88 connects the brake pipe passage 21 to the passage 68 via the cavity 88a, so that fluid under pressure may flow to the chamber 91 via the unseated check valve 98 during upward deflection of the diaphragm 86 for preventing reduction of the pressure in chamber 91 due to expansion in volume of that chamber during such deflection. It is preferable that the stem 93 be of such length, in relation to the length of the pusher stem 100, that the check valve 98 will seat before or at the time the check valve 96 is unseated, because upon unseating of valve 96 some depletion of auxiliary reservoir pressure will result from flow via the auxiliary reservoir passage 39 and passage 95 to the timing volume 63.

In actual construction, satisfactory results have been obtained when the pusher stem 100 and stem 93 and cavity 88a are of such respective lengths that when the slide valve 88, during movement from its normal position to its quick service position, has reached a position (for convenience called an intermediate position) in which the cavity 88a first connects the passages 21 and 63, the follower assemblage 87 will, through the medium of the pusher stem 100, prevent seating of the check valve 98, and the projecting end of said slide valve 88 will either be in very close proximity to or else lightly engage the stem 93 without unseating the check valve 96 against the combined resistance of auxiliary reservoir pressure and spring 97. As soon as the passage 21 is thus opened to the passage 68 and quick service volume 69, brake pipe pressure will almost instantaneously be reduced a degree sufficient to cause the slight additional deflection of the diaphragm 86 necessary to assure positive seating of the check valve 98 and unseating of the check valve 96.

As previously noted, the chamber 91 is preferably of larger volume than the corresponding chamber in quick service valve devices of types heretofore proposed; or, if preferred, a separate volume may be provided in the casing 7 and constantly open to the chamber 91. In either event, the enlarged chamber 91 or the added volume will assure that any reduction in pressure in the chamber 91 will be held to an almost negligible degree after seating of the check valve 98 and during the previously noted slight additional deflection of diaphragm 86; and since brake pipe pressure will be reducing, due to flow via choke 71 into the brake cylinder device 5, such negligible reduction in pressure in the chamber 91 will in no event interrupt movement of the quick service slide valve 88 from the aforementioned intermediate position to its above defined quick service position or cause movement of said slide valve back to said normal position.

Once the slide valve 88 is in its quick service position, brake pipe pressure will continue to be reduced by flow into the brake cylinder device 5 by way of the inshot slide valve cavity 67 and the quick service reduction choke 71. And, as heretofore noted, the check valve 96 will be unseated through the medium of the quick service slide valve 88 and pusher stem 93, for supplying fluid pressure via the passage 95, timing volume 63, inshot slide valve cavity 62 and passage 64 to the pressure chamber 65 of the charging valve device 10 for shifting the slide valve 78 of the latter to its previously defined cut-off position; and, also fluid under pressure will be supplied to the brake cylinder device 5 at a substantially unrestricted rate via the auxiliary reservoir passage 39, service slide valve cavity 36, passage 37, chambers 60, 56 of the inshot valve device, and passage 31.

It will thus be noted that if, by virtue of this substantially unrestricted supply of fluid under pressure from the auxiliary reservoir 4 to the timing volume 63 and chamber 65 and also to the brake cylinder device 5, the auxiliary reservoir pressure should reduce at a more rapid rate than brake pipe pressure in chamber 90 of the quick service valve device 11, as may occur, for example, when the operator effects only a slight reduction of, say, the illustratively assumed .7 p. s. i., in pressure in the brake pipe on the brake-equipped car nearest the locomotive and relies upon continued quick service activity to reduce the brake pipe pressure at such car and also in the "dead" brake pipe volume on a large number of unbraked cars rearward of said brake-equipped car by the aforementioned selected degree of 4 p. s. i., in order to provide the desired minimum brake application, the improved brake apparatus will nevertheless operate to maintain the quick service slide valve 88 in quick service position, and thus assure continued quick service activity, until after brake pipe pressure has been reduced said selected degree; this result being assured because instantaneous equalization of pressure in chamber 91 with reduced auxiliary pressure will be prevented by seating of the check valve 98, and fluid in chamber 91 will be maintained at a pressure sufficient to hold the slide valve 88 in its quick service position.

As is well known in the art, auxiliary reservoir pressure must initially overcome the substantially constant displacement effect of the piston (not shown) of the brake cylinder device 5, and hence it follows that, during a brake application, auxiliary reservoir pressure will reduce at a faster rate than brake pipe pressure; and this difference in rates will be greatest during a minimum brake application. Consequently the chosen value of the spring 101 is such as to assure that the pressure in chamber 91 will exceed auxiliary reservoir pressure by a degree sufficient to offset the maximum differential in reduction rates in the auxiliary reservoir and brake pipe, such as will occur during a minimum brake application. If, after the quick service slide valve 88 has moved to quick service position and the check valve 98 has thus been seated, pressure in chamber 91 exceeds auxiliary reservoir pressure by more than the degree, just described, the check valve 98 will be unseated for reducing the differential to such degree, for desirably maintaining pressure in said chamber 91 at a value as near auxiliary reservoir pressure as possible so as to assure that the quick service slide valve 88 may return to normal position upon subsequent increase in brake pipe pressure.

Since continued quick service activity is required for a period of not more than about fifteen seconds, corresponding to effecting a minimum brake application on a particular car when a maximum, such as twelve to fifteen, unbraked cars are directly rearward of said car and when only the aforementioned slight (.7 p. s. i.) reduction in brake pipe pressure is effected on said particular car, the quick service slide valve 88 need only be maintained in quick service position for a corresponding length of time. Hence, it is desirable, though not essential, that a choke 103 be provided, which, for sake of illustration, may be in the check valve 98, or, if preferred, in a separate communication connecting chamber 91 with auxiliary reservoir passage 39 in by-pass of said check valve. This choke is of such selected flow capacity as to restrict the rate of release of fluid under pressure from the chamber 91 into the auxiliary reservoir passage 39 to an extent sufficient to assure that the quick service slide valve 88 will be maintained in quick service position until after quick service activity is completed under the most adverse conditions, as described in the preceding paragraph. This choke desirably permits pressures in the chamber 91 and auxiliary reservoir 4 to equalize after completion of continued quick activity and thus assure that the quick service slide valve 88 will more promptly return to normal position upon an increase in brake pipe pressure for releasing brakes.

It will be noted that the check valve 98 and pusher stem 100 may be used with a quick service valve device of a type heretofore proposed that does not include the check valve 96 and associated structure for controlling charging of a timing volume. If used with such a quick service valve device, it will of course be understood that the pusher stem 100 would be of such length as to maintain the check valve 98 unseated until the brake pipe passage 21 is first connected to the passage 68; whereupon the resultant quick service reduction in brake pipe pressure in chamber 91 would effect a slight additional deflection of the diaphragm 86 toward the chamber 91 and thus assure positive seating of the check valve 98.

Summary

It will be now be seen that the improved brake apparatus comprises an improved quick service valve device 11 subject at one side to brake pipe pressure and at the opposite side to pressure of fluid in an enlarged chamber 91 (or combination chamber and volume) which is open to the auxiliary reservoir 4 by way of an unseated check valve 98 and auxiliary reservoir passage 39 when the quick service slide valve 88 is in normal position, for permitting the chamber 91 to be charged to the normal operating value of the auxiliary reservoir 4; said check valve being held unseated through the medium of a diaphragm follower assemblage 87 and a pusher stem 100 against resistance of a spring 101. When, however, the quick service slide valve 88 is shifted to its quick service position, the spring 101 will seat the check valve 98 for thereby preventing any excessive reduction in pressure in the enlarged chamber 91 which might cause premature cutoff of continued quick service activity; however, restricted release of fluid under pressure from the enlarged chamber 91 is permitted by way of a choke 103 for assuring that after completion of continued quick service activity, the quick service slide valve 88 will be more promptly returned to its normal position following an increase in brake pipe pressure in the chamber 90 for effecting a release of brakes.

Having now described the invention, what I claim as new and desire to secure by Letters Patent, is:

1. In a fluid pressure brake apparatus, the combination of a brake pipe, a quick service communication through which fluid under pressure may be released from said brake pipe, an auxiliary reservoir, a volume, first valve means controlling connection of said auxiliary reservoir with said volume, quick service valve means subject opposingly to fluid pressures in said brake pipe and volume and adapted when brake pipe pressure is substantially equal to pressure in said volume to close off said brake pipe from said quick service communication and also effect opening of said first valve means for permitting equalization of pressures in said auxiliary reservoir and volume and responsive to a reduction in brake pipe pressure relative to that in said volume to open said brake pipe to said quick service communication for locally effecting a quick service reduction in brake pipe pressure and also permit operation of said first valve means to a closed position in which said volume is closed to said auxiliary reservoir for thereby preventing unrestricted back-flow of fluid under pressure from said volume into said auxiliary reservoir.

2. The combination according to claim 1, including choke means so arranged as to permit fluid pressure in said volume to equalize with that in said auxiliary reservoir at a controlled rate when said first valve means is in its closed position.

3. In a fluid pressure brake apparatus, the combination of a brake pipe, an auxiliary reservoir, a quick service communication through which fluid under pressure may be released from said brake pipe, a quick service valve device comprising movable abutment means subject opposingly to pressure of fluid in said brake pipe and in a certain chamber, said movable abutment means being responsive to a reduction in brake pipe pressure relative to the opposing pressure in said certain chamber to assume a quick service position in which said brake pipe is opened to said quick service communication for locally effecting a quick service reduction in brake pipe pressure, check valve means normally actuated by said movable abutment means to provide substantially unrestricted fluid pressure communication between said certain chamber and auxiliary reservoir but operative when said movable abutment means is in its quick service position to prevent such unrestricted communication except when pressure in said certain chamber exceeds that in said auxiliary reservoir by a preselected degree, and choke means for permitting equalization of fluid pressure in said certain chamber with that in said auxiliary reservoir at a restricted rate independently of said check valve means for causing pressure in said certain chamber to be maintained at a value sufficient to hold said movable abutment means in quick service position for a desired period of time measured from initial movement of said movable abutment means to such position.

4. In a fluid pressure brake apparatus, the combination of a brake pipe, an auxiliary reservoir, a quick service communication through which fluid under pressure may be released from said brake pipe, a quick service valve device comprising movable abutment means subject opposingly to pressures of fluid in said brake pipe and in a certain chamber, said movable abutment means being operative when brake pipe pressure is substantially equal to the opposing pressure in said certain chamber to assume a normal position for closing off said brake pipe from said quick service communication and responsive to a reduction in brake pipe pressure relative to such opposing pressure to assume a quick service position for opening said brake pipe to said quick service communication for locally effecting a quick service reduction in brake pipe pressure, a pusher stem, a check valve adapted to be unseated by said movable abutment means through the medium of said pusher stem when said movable abutment means is in its said normal position for opening said certain chamber to said auxiliary reservoir, bias means effective to move said check valve to a closed position for closing off said certain chamber from said auxiliary reservoir when by movement of said movable abutment means to its quick service position said pusher stem no longer exerts force on said check valve, and choke means for permitting pressure in said certain chamber to equalize into said auxiliary reservoir at a restricted rate when said check valve is in its closed position.

5. In a fluid pressure brake apparatus, the combination of a normally charged brake pipe, a quick service communication through which fluid under pressure may be released from said brake pipe for causing a local quick service reduction in brake pipe pressure, a brake cylinder, means operative to close said quick service communication responsively to brake cylinder pressure in excess of a predetermined value corresponding to a desired minimum degree of brake application, a normally charged auxiliary reservoir, means defining a chamber, means controlling a substantially unrestricted communication between said auxiliary reservoir and chamber, and quick service effecting means subject opposingly to brake pipe pressure and to pressure of fluid in said chamber and normally in one position for cutting off said brake pipe from said quick service communication and causing said controlling means to establish said unrestricted communication and responsive to a slight reduction in brake pipe pressure relative to the pressure in said chamber to move to a quick service position for opening said brake pipe to said quick service communication and causing said controlling means to disestablish said unrestricted communication.

6. The combination according to claim 5, including timing means for permitting pressure in said chamber to equalize into said auxiliary reservoir independently of said controlling means at a restricted rate so selected as to assure that said quick service communication will be closed by the brake cylinder pressure responsive means before said quick service effecting means can return to its said one position.

References Cited in the file of this patent

UNITED STATES PATENTS

| | | |
|---|---|---|
| 1,531,205 | McSweeney | Mar. 24, 1925 |
| 1,980,322 | Cook | Nov. 13, 1934 |
| 2,016,411 | Cook | Oct. 8, 1935 |
| 2,707,134 | Cook | Apr. 26, 1955 |